(12) United States Patent
Cremona et al.

(10) Patent No.: US 10,281,926 B2
(45) Date of Patent: May 7, 2019

(54) APPARATUS AND METHOD FOR CONTROLLING VEHICLES IN A PLATOON

(71) Applicant: Bendix Commercial Vehicle Systems LLC, Elyria, OH (US)

(72) Inventors: Michael D. Cremona, Lakewood, OH (US); Jeffrey M. Carbaugh, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 37 days.

(21) Appl. No.: 15/412,681

(22) Filed: Jan. 23, 2017

(65) Prior Publication Data

US 2018/0210461 A1    Jul. 26, 2018

(51) Int. Cl.

| | |
|---|---|
| *B60T 7/16* | (2006.01) |
| *B60T 7/22* | (2006.01) |
| *B60T 8/17* | (2006.01) |
| *G05D 1/00* | (2006.01) |
| *G05D 1/02* | (2006.01) |
| *G08G 1/00* | (2006.01) |
| *G08G 1/16* | (2006.01) |

(52) U.S. Cl.
CPC .............. *G05D 1/0293* (2013.01); *B60T 7/16* (2013.01); *B60T 7/22* (2013.01); *B60T 8/17* (2013.01); *G05D 1/0011* (2013.01); *G08G 1/161* (2013.01); *G08G 1/22* (2013.01); *B60T 2201/02* (2013.01); *B60T 2210/32* (2013.01)

(58) Field of Classification Search
CPC ...... G05D 1/0293; G05D 1/0011; B60T 7/16; B60T 7/22; B60T 8/17; B60T 2201/02; B60T 2210/32; G08G 1/161; G08G 1/22

USPC ............................................................ 701/2
See application file for complete search history.

(56) References Cited

U.S. PATENT DOCUMENTS

| | | |
|---|---|---|
| 3,710,385 A | 1/1973 | Howard et al. |
| 5,357,438 A | 10/1994 | Davidian |
| 5,948,035 A | 9/1999 | Tomita |

(Continued)

FOREIGN PATENT DOCUMENTS

| | | |
|---|---|---|
| CN | 105774780 B | 10/2018 |
| EP | 1800982 B1 | 10/2013 |

(Continued)

*Primary Examiner* — Aaron L Troost
*Assistant Examiner* — Paula L Schneider
(74) *Attorney, Agent, or Firm* — Brian E. Kondas; Cheryl L. Greenly; Eugene E. Clair

(57) ABSTRACT

A system for controlling vehicles in a platoon includes a lead vehicle controller on a lead vehicle in the platoon and a following vehicle controller on a following vehicle in the platoon. The lead vehicle controller is adapted to determine a braking distance, based on an initial speed of the lead vehicle and a percent of full service brake application of the lead vehicle, and transmit a braking distance signal indicating the braking distance. The following vehicle controller is adapted to identify the braking distance upon receiving the braking distance signal, determine a percent of full service brake application of the following vehicle based on an initial speed of the following vehicle and the braking distance, and transmit a signal to a following vehicle service brake to apply the following vehicle service brake at the determined percent of full service brake application.

20 Claims, 3 Drawing Sheets

(56) References Cited

U.S. PATENT DOCUMENTS

| | | | |
|---|---|---|---|
| 5,954,781 A | 9/1999 | Slepian et al. | |
| 6,401,024 B1 | 6/2002 | Tange et al. | |
| 8,744,652 B1 * | 6/2014 | Nishinaga | B61L 3/00 |
| | | | 188/38 |
| 2009/0062987 A1 | 3/2009 | Kim et al. | |
| 2009/0299594 A1 | 12/2009 | Harumoto et al. | |
| 2011/0224844 A1 * | 9/2011 | Farwell | G05D 1/0295 |
| | | | 701/2 |
| 2012/0101713 A1 | 4/2012 | Moshchuk et al. | |
| 2013/0116861 A1 | 5/2013 | Nemoto | |
| 2014/0244150 A1 | 8/2014 | Boesch et al. | |

FOREIGN PATENT DOCUMENTS

| | | | |
|---|---|---|---|
| GB | 2512576 A | 10/2014 | |
| JP | 2006074876 A | 3/2006 | |
| JP | 2006309552 A | 11/2006 | |
| WO | 2003049975 A1 | 6/2003 | |
| WO | 2012105896 A1 | 8/2012 | |
| WO | 2016135207 A1 | 9/2016 | |

* cited by examiner

APPARATUS AND METHOD FOR CONTROLLING VEHICLES IN A PLATOON

BACKGROUND

The present invention relates to platooning vehicles. It finds particular application in conjunction with controlling vehicles in a platoon and will be described with particular reference thereto. It will be appreciated, however, that the invention is also amenable to other applications.

Platooning involves coupling (e.g., electronically coupling) vehicles together on a roadway. Vehicles in the platoon typically follow other vehicles in the platoon at relatively shorter distances than non-platooning vehicles follow other vehicles. A first vehicle in the platoon is referred to as a "lead" vehicle, and other vehicles in the platoon behind the lead vehicle are referred to as "following" vehicles. Interest in platooning vehicles on public roadways has received increased interest due to the benefits provided. For example, because of the reduced following distances, the platooning vehicles require less roadway space that could also lead to less road congestion. In addition, platooning can result in increased fuel economy of both the lead vehicle and the following vehicles participating in the platoon. Despite the benefits offered by the shorter following distances, each of the following vehicles in the platoon must be able to decelerate quickly enough to avoid colliding with the respective forward vehicle.

Each vehicle in a platoon commonly has a unique braking performance. Determining the order and correct spacing of vehicles to avoid a following vehicle from colliding with a forward vehicle based on each vehicle's individual braking performance may be complicated.

The present invention provides a new and improved apparatus and method for updating a lookup table for a vehicle in a platoon and for controlling vehicles in the platoon.

SUMMARY

In one aspect of the present invention, it is contemplated that a controller controls a following vehicle in a platoon. The controller is adapted to receive a signal from another vehicle in the platoon, which is positioned in front of the following vehicle, identify a stopping distance of the other vehicle based on the signal, determine a percentage of full service brake application of the following vehicle based on an initial speed of the following vehicle and the identified stopping distance, and transmit a signal for applying a service brake of the following vehicle to achieve the percentage of full service brake application.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
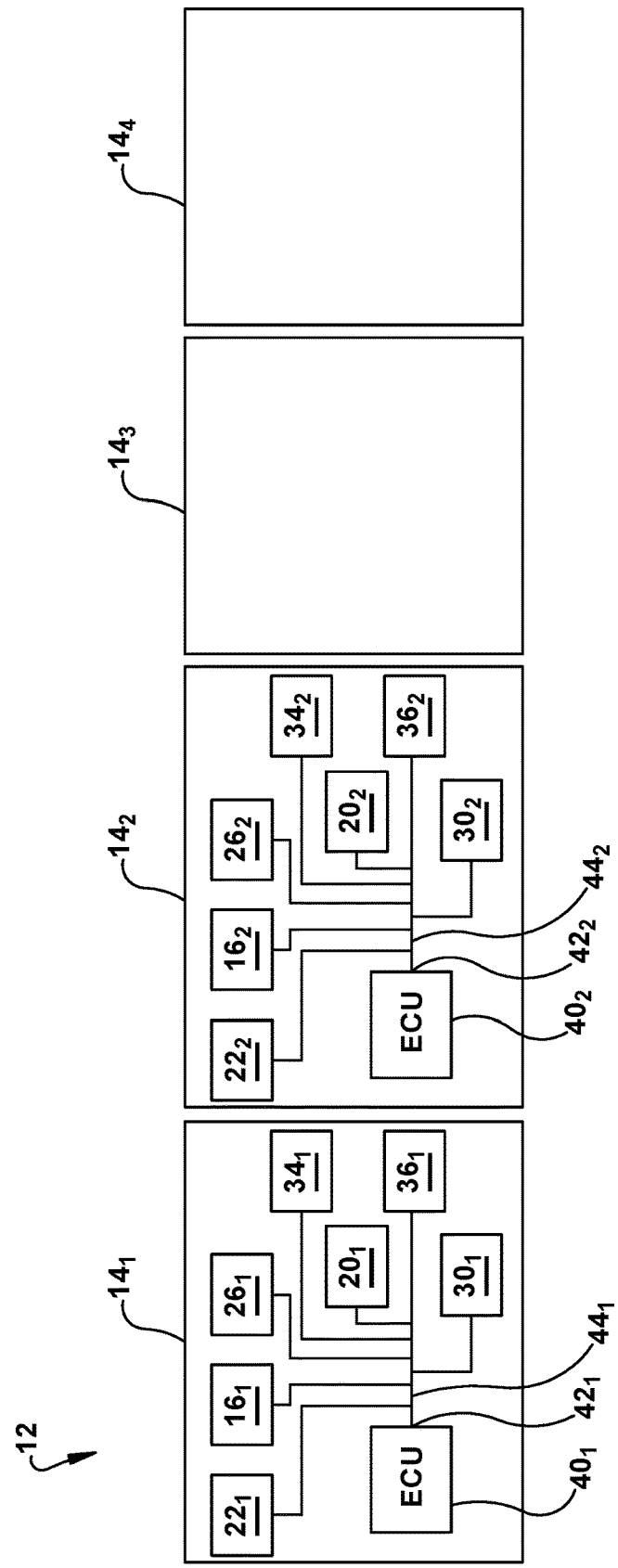
FIG. 1 illustrates a schematic representation of a simplified component diagram of an exemplary platoon of vehicles in accordance with one embodiment of an apparatus illustrating principles of the present invention.

With reference to FIG. 1, a simplified component diagram of an exemplary platoon 12 is illustrated in accordance with one embodiment of the present invention. The platoon 12 includes a plurality of individual vehicle 14. In the illustrated embodiment, the platoon 12 includes four (4) vehicles $14_{1,2,3,4}$ (collectively 14). The first vehicle $14_1$ is designated as the lead vehicle of the platoon 12 and the remaining vehicles $14_{2,3,4}$ are referred to as following vehicles of the platoon 12. In addition, each of the vehicles $14_{1,2,3}$ is considered to be a "forward vehicle" to the respective "following vehicles" $14_{2,3,4}$.

Each of the vehicles $14_{1,2,3,4}$ includes a respective distance measuring device $16_{1,2,3,4}$ (collectively 16), a respective lookup table $20_{1,2,3,4}$ (collectively 20), a respective brake pedal $22_{1,2,3,4}$ (collectively 22), a brake pedal sensor $24_{1,2,3,4}$ (collectively 24), a vehicle speed sensor $26_{1,2,3,4}$ (collectively 26), service brakes $30_{1,2,3,4}$ (collectively 30), service brake sensors $32_{1,2,3,4}$ (collectively 32), a wireless radio-frequency (RF) transmitter $34_{1,2,3,4}$ (collectively 34), a wireless RF receiver $36_{1,2,3,4}$ (collectively 36), and an electronic control unit $40_{1,2,3,4}$ (collectively 40). Each of the brake pedals 22 is depressed by an operator of the respective vehicle 14 for engaging the service brakes 30 on that vehicle 14. Each of the brake pedal sensors 24 transmits a respective electronic signal when the brake pedal 22 on the same vehicle 14 is depressed.

Each of the distance measuring devices 16, the lookup tables 20, the brake pedal sensors 24, the speed sensors 26, the transmitters 34, and the receivers 36 electronically communicate with the ECU 40 on the respective vehicle 14 (e.g., the same vehicle 14) via a respective electrical port $42_{1,2,3,4}$ (collectively 42) on the ECU 40 and a respective vehicle communication bus $44_{1,2,3,4}$ (collectively 44). In the illustrated embodiment, the distance measuring devices 16, the lookup tables 20, the brake pedal sensors 24, the speed sensors 26, the transmitters 34, and the receivers 36 electronically communicate with the ECU 40 on the same vehicle 14 via an electrically wired connection (e.g., via the vehicle communication bus 44). However, other embodiments, in which the distance measuring devices 16, the lookup tables 20, the brake pedal sensors 24, the speed sensors 26, the transmitters 34, and the receivers 36 communicate with the ECU 40 on the same vehicle 14 via a wireless RF connection are also contemplated. It is contemplated that the distance measuring devices 16 are global positioning systems (GPSs), accelerometers, etc.

The lookup tables 20 store stopping distances (e.g., deceleration distances) at various speeds and percent of full brake applications for the respective vehicle 14. For example, the $20_1$ stores stopping distances for the lead vehicle $14_1$ at various speeds and percent of full brake applications. In a more specific example, the $20_1$ may include a stored entry indicating that the lead vehicle $14_1$ has a stopping distance of 200 feet when a 30% brake application (e.g., 30% of a full brake application) is applied at 30 miles per hour (mph).

Figure 2:
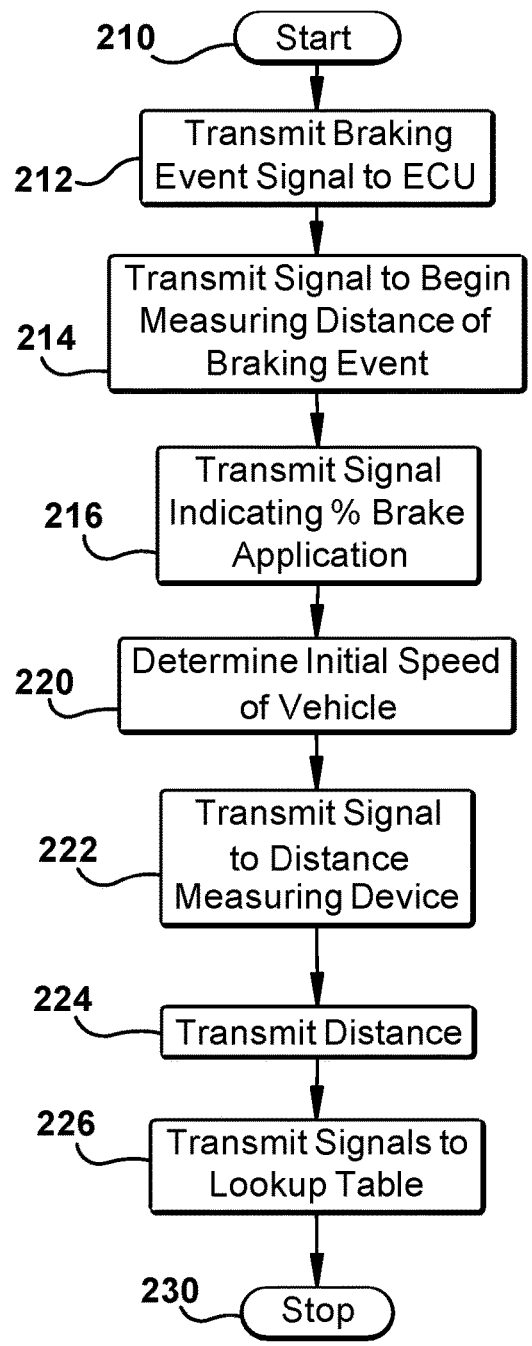
FIG. 2 is an exemplary methodology of updating a lookup table in accordance with one embodiment illustrating principles of the present invention.

The lookup table $20_1$ is continuously updated as braking events occur. With reference to FIG. 2, an exemplary methodology of the system shown in FIG. 1 for continuously updating a lookup table 20 (e.g., the lookup table $20_1$ on the lead vehicle $14_1$) as braking events occur is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

It is contemplated that each of the respective ECUs 40 act as a means for controlling the vehicle 14 (e.g., by controlling the stopping distance) in the platoon 12.

With reference to FIGS. 1 and 2, the method of updating the lookup table $20_1$ starts in a step 210. As an example, for each braking event the ECU $40_1$ determines when an operator of the lead vehicle $14_1$ depresses the brake pedal $22_1$ associated with the service brake $30_1$. More specifically, in a step 212, the brake pedal $22_1$ transmits an electronic signal to the ECU $40_1$ indicating that the brake pedal 22 has been depressed, which indicates the beginning of the braking event. After receiving the electronic signal from the brake pedal $22_1$, in a step 214 the ECU 40 transmits an electronic signal to the distance measuring device $16_1$ to begin measuring the distance of the braking event.

The ECU $40_1$ also determines the percentage of full application the service brake 30 is applied during the event. More specifically, in a step 216, the service brake 30 transmits a signal to the ECU $40_1$ indicating the percentage of full application the service brake 30. In addition, in a step 220, the ECU $40_1$ determines the initial speed of the lead vehicle $14_1$ upon receiving an electronic speed signal at the beginning of the braking event from the vehicle speed sensor $26_1$. After the braking event (e.g., after the vehicle $14_1$ has stopped braking), the ECU $40_1$ transmits an electronic signal, in a step 222, to the distance measuring device $16_1$ which triggers the distance measuring device $16_1$ to transmit an electronic signal, in a step 224, to the ECU $40_1$ indicating the distance the vehicle $14_1$ traveled since the beginning of the braking event.

Then, the ECU $40_1$ transmits, in a step 226, electronic signals to the lookup table $20_1$ causing the initial speed of the vehicle (e.g., at the beginning of the braking event), the distance of the braking event (e.g., the stopping distance) and the percentage of full brake application to be stored in the lookup table $20_1$. The method of updating the lookup table $20_1$ stops in a step 230. Since the above process is repeated for each braking event, the lookup table $20_1$ is said to be continuously updated with the vehicle's 14 braking profile using the self-learning process described above.

Although the continuous update process has been described only with reference to the lead vehicle $14_1$, it is to be understood the respective lookup tables $20_{1,2,3,4}$ in each of the vehicles $14_{1,2,3,4}$ is continuously updated with the vehicle's braking profile as described above.

Figure 3:
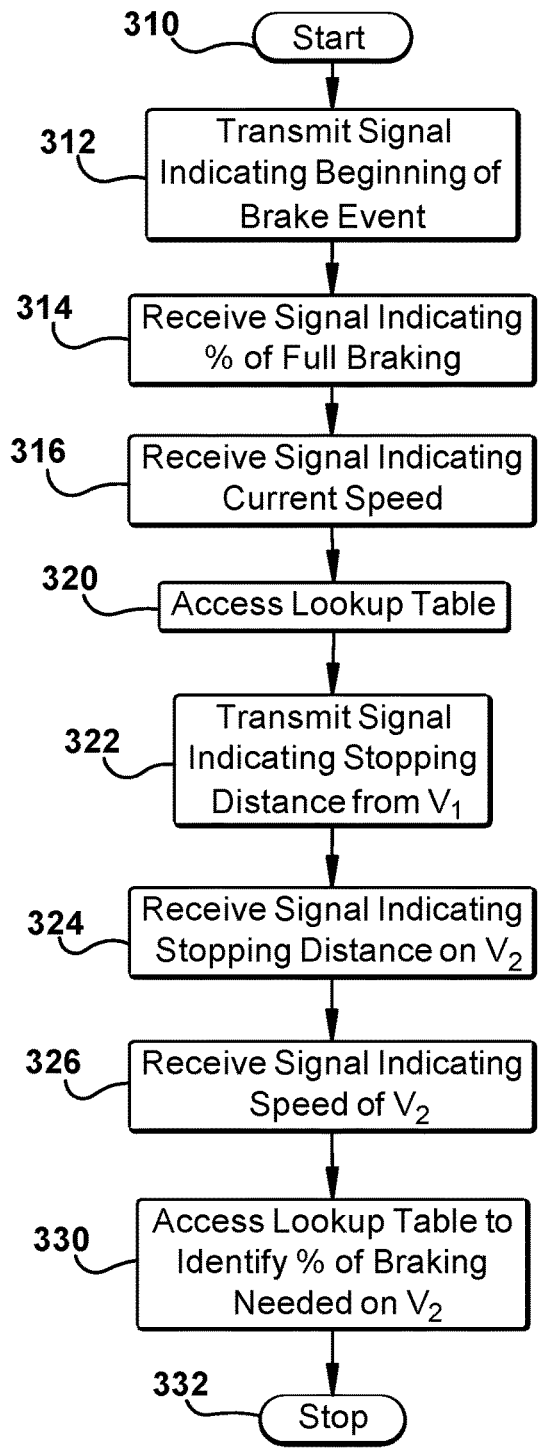
FIG. 3 is an exemplary methodology of controlling vehicles in a platoon in accordance with one embodiment illustrating principles of the present invention.

With reference to FIG. 3, an exemplary methodology of the system shown in FIG. 1 for controlling the vehicles 14 in the platoon 12 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 3, the method for controlling the vehicles 14 in the platoon 12 starts in a step 310. When the operator of the lead vehicle $14_1$ depresses the brake pedal $22_1$, the brake pedal sensor $24_1$ transmits, in a step 312, an electronic signal to the ECU $40_1$ indicating a braking event is beginning. After receiving the electronic signal from the brake pedal sensor $24_1$, the ECU $40_1$ receives, in a step 314, an electronic signal from the service brake sensor $32_1$ indicating a percentage of full braking that the service brakes $30_1$ are currently applied. The ECU $40_1$ also receives, in a step 316, an electronic signal from the speed sensor $26_1$ indicating the current speed of the vehicle $14_1$. Then, in a step 320, the ECU $40_1$ accesses the lookup table $20_1$ to identify the stopping distance of the vehicle $14_1$ based on the current percentage of full braking and speed.

The lead vehicle $14_1$ then transmits, in a step 322, signals indicating the stopping distance via the wireless transmitter $34_1$ on the lead vehicle $14_1$. The ECU $40_2$ on the following vehicle $14_2$ receives, in a step 324, the signals indicating the stopping distance of the lead vehicle $14_1$ via the wireless receiver $36_2$ on the following vehicle $14_2$.

The ECU $40_2$ on the following vehicle $14_2$ then receives, in a step 326, signals indicating the speed of the following vehicle $14_2$ from a speed sensor $26_2$ on the following vehicle $14_2$. Next, the ECU $40_2$ accesses, in a step 330 the lookup table $20_2$ to identify the percentage of full braking that service brakes $30_2$ on the following vehicle $14_2$ need to be applied to stop the following vehicle $14_2$ in the same stopping distance received from the lead vehicle $14_1$.

The method for controlling the vehicles 14 in the platoon 12 stops in a step 332.

Although the steps 310-332 for controlling the vehicles 14 in the platoon 12 only describe controlling the second vehicle $14_2$ (e.g., the following vehicle) based on an electronic signal received from the lead vehicle $14_1$, it is to be understood the stopping distance transmitted from the lead vehicle $14_1$ is also received by the other vehicles (e.g., the following vehicles $14_{3,4}$) in the platoon 12.

In another embodiment, it is contemplated that once the second vehicle $14_2$ (e.g., following vehicle) in the platoon 12 receives the electronic signal from the lead vehicle $14_1$ indicating the stopping distance, the second vehicle $14_2$ in the platoon 12 transmits an electronic signal to the third vehicle $14_3$ (e.g., following vehicle) indicating the stopping distance, etc. Therefore, in either embodiment, all of the following vehicles $14_{2,3,4}$ in the platoon 12 are controlled by a vehicle in front of the respective following vehicle $14_{2,3,4}$ (e.g., either immediately in front of the respective following vehicle $14_{2,3,4}$ or by another vehicle in the platoon that is not immediately in front of the respective following vehicle $14_{2,3,4}$). In other words, each of the following vehicles $14_{2,3,4}$ in the platoon 12 receives an electronic signal, which indicates the stopping distance, from another vehicle in the platoon 12 that is in front of the respective following vehicle $14_{2,3,4}$. In addition, the other vehicles $14_{3,4}$ (e.g., following vehicle) determine the respective percentages of full braking of service brakes $30_{3,4}$ on those vehicles $14_{3,4}$ in a similar manner described above with regard to the second vehicle $14_2$ in the steps 310-332.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for controlling a following vehicle in a platoon, the controller comprising:
   an electrical port adapted to receive and transmit signals, wherein the controller:
   receives, via the electrical port, a brake activation signal from another vehicle in the platoon, the other vehicle being positioned in front of the following vehicle,
   identifies a stopping distance of the other vehicle and transmits a first lookup signal to a lookup table on the following vehicle in response to receiving the brake activation signal, wherein the first lookup signal indicates an initial speed of the following vehicle and the identified stopping distance,
   receives a second lookup signal from the lookup table including a determined percentage of full service brake application of the following vehicle based on the first lookup signal and
   transmits a brake application signal, via the electrical port, for applying a service brake of the following vehicle to achieve the determined percentage of full service brake application.

2. The controller for controlling a following vehicle in a platoon as set forth in claim 1, wherein:
   the controller transmits an update lookup signal to update the lookup table based on an actual stopping distance, the initial speed and percentage of full brake application of the following vehicle.

3. The controller for controlling a following vehicle in a platoon as set forth in claim 1, wherein:
   the wireless RF receiver wirelessly receives the brake activation signal from the other vehicle and transmits the brake activation signal to the electrical port.

4. The controller for controlling a following vehicle in a platoon as set forth in claim 1, wherein:
   the controller determines an actual stopping distance of the following vehicle based on the initial speed and the determined percentage of full service brake application; and
   the controller transmits an update lookup signal to the lookup table on the following vehicle, the update lookup signal indicating the initial speed of the following vehicle, the actual stopping distance and the determined percentage of full service brake application.

5. The controller for controlling a following vehicle in a platoon as set forth in claim 1, wherein:
   the other vehicle is a lead vehicle of the platoon.

6. The controller for controlling a following vehicle in a platoon as set forth in claim 1, wherein:
   the controller transmits a second following vehicle stop signal, identifying the stopping distance, from the following vehicle to a second following vehicle.

7. A system for controlling vehicles in a platoon, the system comprising:
   a lead vehicle controller, on a lead vehicle in the platoon, i) that determines a braking distance based on an initial speed of the lead vehicle and a percent of full service brake application of the lead vehicle and ii) transmits a braking distance signal indicating the braking distance; and
   a following vehicle controller, on a following vehicle in the platoon, i) that identifies the braking distance upon receiving the braking distance signal, ii) determines a percent of full service brake application of the following vehicle based on an initial speed of the following vehicle and the braking distance and iii) transmits a brake application signal to the following vehicle service brake to apply the following vehicle service brake at the determined percent of full service brake application.

8. The system for controlling vehicles in a platoon as set forth in claim 7, further comprising:
   a lead vehicle speed sensor electrically communicating with the lead vehicle controller, the lead vehicle controller determining the lead vehicle speed based on a lead vehicle speed signal received from the lead vehicle speed sensor and
   a following vehicle speed sensor electrically communicating with the following vehicle controller, the following vehicle controller determining the following vehicle speed based on a following vehicle speed signal received from the following vehicle speed sensor.

9. The system for controlling vehicles in a platoon as set forth in claim 7, further comprising:
   a lead vehicle service brake sensor electrically communicating with the lead vehicle controller, the lead vehicle controller identifying a start of a braking event upon receiving an electronic brake actuation signal from the lead vehicle service brake sensor;
   wherein the lead vehicle controller determines the initial speed of the lead vehicle at the start of the braking event and transmits the braking distance signal based on the initial speed at the start of the braking event.

10. The system for controlling vehicles in a platoon as set forth in claim 7, the lead vehicle controller further comprising:
    a lead vehicle lookup table electrically communicating with the lead vehicle controller, the lead vehicle controller transmits a lead vehicle first lookup signal to the lead vehicle lookup table, indicating the initial speed of the lead vehicle and the percent of full service brake application of the lead vehicle, and receives a lead vehicle second lookup signal from the lead vehicle lookup table indicating the lead vehicle braking distance.

11. The system for controlling vehicles in a platoon as set forth in claim 10, wherein the lead vehicle controller updates the lead vehicle lookup table.

12. The system for controlling vehicles in a platoon as set forth in claim 11, further comprising:
    a lead vehicle distance measuring device;
    a lead vehicle service brake sensor; and
    a lead vehicle speed sensor;
    wherein the lead vehicle controller i) receives a lead vehicle brake activation signal from the lead vehicle service brake sensor upon activation of the service brake of the lead vehicle, ii) receives a lead vehicle actual brake distance signal from the lead vehicle distance measuring device indicating the lead vehicle actual braking distance and iii) transmits a lead vehicle update signal to the lead vehicle lookup table to update the lead vehicle lookup table with the lead vehicle actual braking distance based on the lead vehicle initial speed and lead vehicle percent of full service brake application.

13. The system for controlling vehicles in a platoon as set forth in claim 12, further comprising:
a following vehicle lookup table;
a following vehicle distance measuring device;
a following vehicle service brake sensor; and
a following vehicle speed sensor;
the following vehicle controller i) receives a following vehicle brake activation signal from the following vehicle service brake sensor upon activation of the service brake of the following vehicle, ii) receives a following vehicle actual brake distance signal from the distance measuring device indicating the following vehicle actual braking distance and iii) transmits a following vehicle update signal to the following vehicle lookup table to update the following vehicle lookup table with the following vehicle actual braking distance based on the following vehicle initial speed and following vehicle percent of full service brake application.

14. The system for controlling vehicles in a platoon as set forth in claim 12, wherein:
upon receiving the lead vehicle brake activation signal indicating activation of the service brake of the lead vehicle, the lead vehicle controller transmits a lead vehicle actual braking distance start signal to the lead vehicle distance measuring device to begin measuring an actual braking distance of the lead vehicle; and
upon receiving a lead vehicle brake event end signal from the lead vehicle speed sensor indicating an end of the braking event, the lead vehicle controller transmits a lead vehicle actual braking distance stop signal to the lead vehicle distance measuring device to stop measuring the actual braking distance, determine the actual braking distance of the lead vehicle and transmit the lead vehicle actual brake distance signal to the lead vehicle controller indicating the actual braking distance.

15. A method for controlling vehicles in a platoon, the method comprising:
determining a braking distance of a lead vehicle based on an initial speed of the lead vehicle and a percent of full service brake application of the lead vehicle;
transmitting a lead vehicle braking distance signal, indicting the braking distance, from the lead vehicle;
receiving the lead vehicle braking distance signal at a following vehicle;
determining a percent of full service brake application of the following vehicle based on an initial speed of the following vehicle and the lead vehicle braking distance; and
transmitting a following vehicle brake application signal to the following vehicle to apply the following vehicle service brake at the determined percent of full service brake application.

16. The method for controlling vehicles in a platoon as set forth in claim 15, further comprising:
determining an initial speed of the lead vehicle.

17. The method for controlling vehicles in a platoon as set forth in claim 15, wherein the step of determining the braking distance comprises:
transmitting a lookup signal to a lead vehicle lookup table indicating the initial speed of the lead vehicle and the percent of full service brake application of the lead vehicle;
identifying the lead vehicle braking distance, based on the initial speed of the lead vehicle and the percent of full service brake application of the lead vehicle, in the lookup table; and
transmitting the lead vehicle braking distance from the lookup table.

18. The method for controlling vehicles in a platoon as set forth in claim 17, further comprising:
determining a lead vehicle actual braking distance based on the initial speed of the lead vehicle and the percent of full service brake application of the lead vehicle; and
updating the lead vehicle lookup table with the lead vehicle actual braking distance based on the initial speed of the lead vehicle and the percent of full service brake application of the lead vehicle.

19. The method for controlling vehicles in a platoon as set forth in claim 15, further comprising:
transmitting the lead vehicle braking distance signal to a second following vehicle.

20. The method for controlling vehicles in a platoon as set forth in claim 19, further comprising:
determining a percent of full service brake application of the second following vehicle based on an initial speed of the second following vehicle and the lead vehicle braking distance.

\* \* \* \* \*